(12) United States Patent
Kim

(10) Patent No.: US 6,216,830 B1
(45) Date of Patent: Apr. 17, 2001

(54) SHOCK ABSORBER

(75) Inventor: Keun-Bae Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/419,697

(22) Filed: Oct. 14, 1999

(30) Foreign Application Priority Data

Apr. 26, 1999 (JP) .................................................. 99-14864

(51) Int. Cl.[7] ...................................................... F16F 9/34
(52) U.S. Cl. .................................. 188/266.2; 188/322.15
(58) Field of Search ............................. 188/266.2, 266.5, 188/322.15, 322.22

(56) References Cited

U.S. PATENT DOCUMENTS

| | | | | |
|---|---|---|---|---|
| 3,706,362 | * | 12/1972 | Faure | 188/322.15 |
| 4,061,295 | * | 12/1977 | Somm | 188/266.2 |
| 4,520,908 | * | 6/1985 | Carpenter | 188/266.2 |
| 5,850,896 | * | 12/1998 | Tanaka | 188/266.2 |
| 6,003,644 | * | 12/1999 | Tanaka | 188/266.2 |

\* cited by examiner

*Primary Examiner*—Chris Schwartz
(74) *Attorney, Agent, or Firm*—Christie, Parker & Hale, LLP

(57) ABSTRACT

A shock absorber adapted for use in attenuation of vibration for prevention of sudden increase or decrease of attenuating force of plate-like open/close valve to thereby improve a rideability of a vehicle, the shock absorber disposed with a piston having a cylindrically closed housing filled with fluid where an attenuating force is generated by a fluid resistance caused by the fluid moving through orifices, the shock absorber comprising: a valve formed to horizontally move on upper/bottom surfaces of the piston to thereby open and close the orifices; a guide unit disposed between the valve and the piston to enable the piston to horizontally move and to prevent the piston from breaking away to the other direction; and an actuating unit for horizontally changing a force applied to the fluid to move the valve when the piston is moved toward an expanding direction.

8 Claims, 5 Drawing Sheets

SHOCK ABSORBER

BACKGROUND OF THE INVENTION

1. Field of the Invention

The present invention relates to a shock absorber adapted for use in a vehicle suspension system for vibration attenuation.

2. Description of the Prior Art

Generally, a suspension system applied to a vehicle is provided with a shock absorber constructed to cushion a shock by way of a coil spring and to prevent repeated vibrations generated during the shock buffering of the coil spring.

In other words, the coil spring serves to cushion the shock and the like from the road surface to transmit same to a body of the vehicle and the repeated vibrations according to the shock buffering action of the coil spring are attenuated to thereby maintain vehicle safety while running and to reduce swaying, such rolling, and pitching of the vehicle.

The shock absorber is dually formed, as illustrated in FIG. 5, with inner and outer tubes 50 and 51, between which there are provided a housing 53 formed with a storage chamber 52, a rod 54 arranged to pierce the inner tube 50, a piston 57 disposed at a longitudinal end of the rod 54 to divide the inner tube 50 into a first and a second chamber 55 and 56 and a foot valve 58 equipped at a longitudinal end of the inner tube 50.

Furthermore, the shock absorber is formed with a vibroisolating tube 59 to encompass an exterior surface of the outer tube 51, and a bushing 60 for connecting wheels and body (not shown) is installed at a longitudinal end of the rod 54 and at facing end of the outer tube 51. The inner and outer tubes 50 and 51 are filled with fluid (F).

The piston 57 is installed with an open/close valve 61 in order to generate an attenuating force by restricting movement of fluid (F) filled in the inner tube 50, where, the piston 57 includes, as illustrated in FIG. 6, a plurality of orifices 62 formed at the piston 57 and a plate-like open/close valve for blocking the orifices 62 during compression and for opening the orifices during expansion.

Now, operation of the shock absorber thus constructed will be described in detail. When wheels are bounced while a vehicle is running, the housing 53 connected to the wheels (suspension arms and the like) rises, by which the piston 57 moves toward a direction of compressing the second chamber 56. When the second chamber 56 is compressed by the piston 57, the open/close valve 61 maintains a closeness, where the fluid compressed in the second chamber 56 is infused into the storing chamber 52 via the foot valve 58 to thereby enable the piston 57 to descend.

When the wheels are rebounded to lower the housing 53 while the piston 57 is descended, the piston 57 is resulted to go upwards, and when the piston 57 is ascended, the open/close valve 61 blocking the orifices 62 is bent to open the orifices 62.

When the orifices 62 are opened, the fluid (F) moves through the orifices 62 to move towards the second chamber 56, where, an attenuating force is generated which is as strong as fluid resistance generated while passing through the orifices 62 and the open/close valve 61.

The open/close valve 61 is usually made of same material in plate-like shape. The attenuating force relative to speed of the piston 57 is linearly increased at a predetermined ratio but suddenly turns upwards at a strain point (V).

In other words, the attenuating force is increased relatively slow before the strain point (V) but is suddenly increased past the strain point (V). this linear ratio change of the attenuating force is caused by a phenomenon where, when the plate-like open/close valve 61 is bent to exceed a predetermined extent, resilience thereof is markedly increased, which remarkably increases fluid resistance according to the open/close valve 61, thereby changing the linear ratio of the attenuating force.

SUMMARY OF THE INVENTION

However, there is a problem in that when an attenuating force of an open/close valve is not linearly changed due to a part where resilience of the open/close valve disposed at the piston thus described is suddenly increased, a sudden increase or decrease of attenuating force at the strain point (V) is realized, such that an abnormal vibration and the like are generated at the strain point (V) to thereby decrease rideability and running safety of a vehicle.

The present invention is disclosed to solve the aforementioned problems and it is an object of the present invention to provide a shock absorber constructed to prevent a sudden increase or decrease of attenuating force at a predetermined position during operation of vibration attenuation at the shock absorber to thereby increase the rideability and running safety of a vehicle.

In accordance with the object of the present invention, there is provided a shock absorber disposed with a piston having a cylindrically closed housing filled with fluid where an attenuating force is generated by a fluid resistance caused by the fluid moving through orifices, the shock absorber comprising:

- a valve formed to horizontally move on upper/bottom surfaces of the piston to thereby open and close the orifices;
- guide means disposed between the valve and the piston to enable the piston to horizontally move and to prevent the piston from breaking away to the other direction; and
- actuating means for horizontally changing a force applied to the fluid to move the valve when the piston is moved toward an expanding direction.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described with reference to the accompanying drawings.

Figure 1:
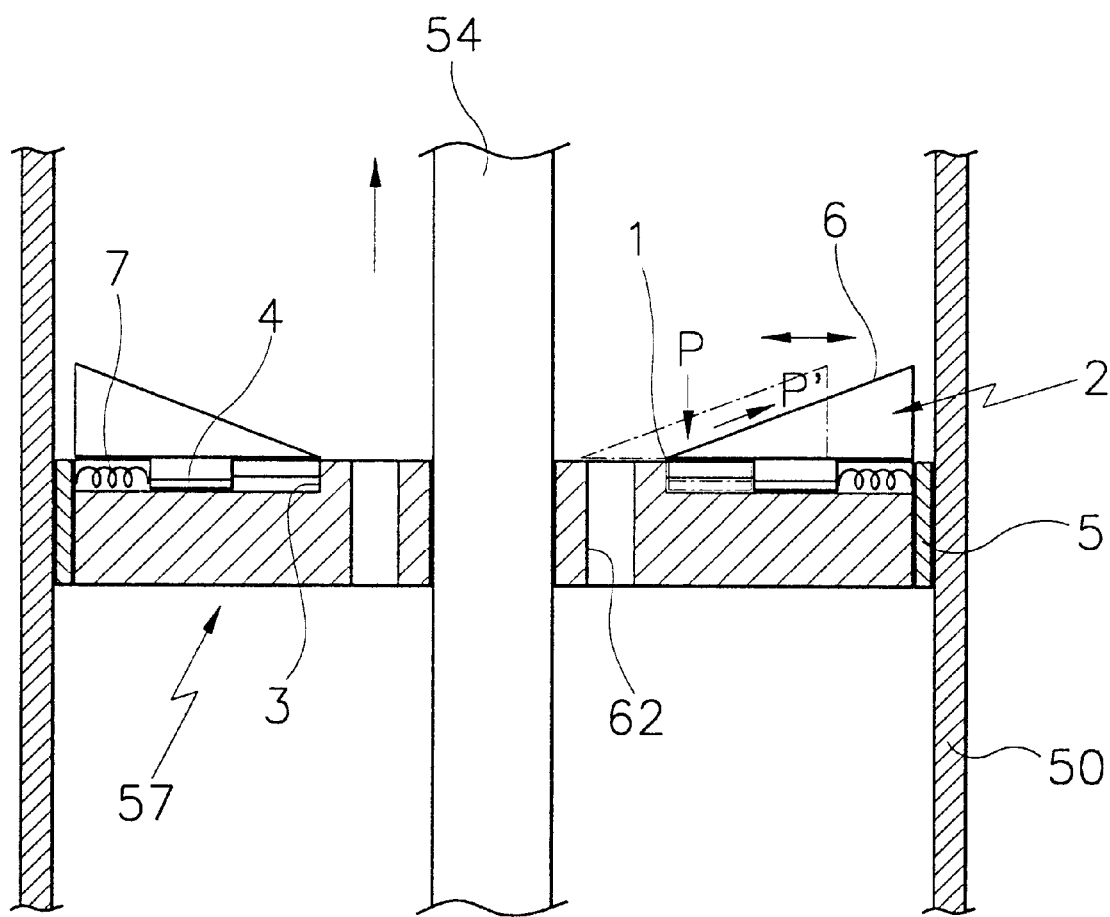
FIG. 1 is an enlarged section view of a part for illustrating a disposition of a valve at a shock absorber according to the present invention.
Figure 2:
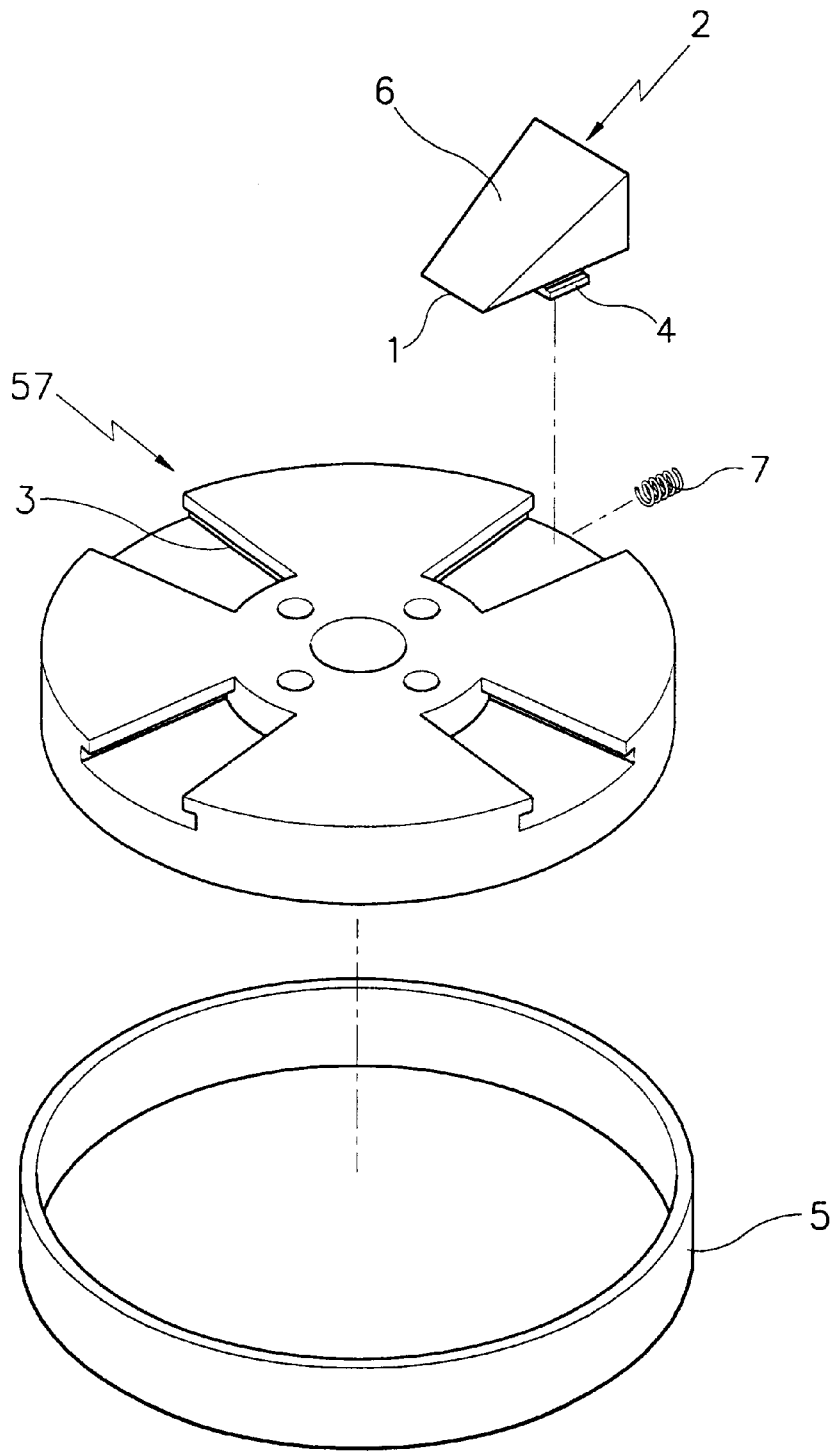
FIG. 2 is an exploded perspective view of FIG. 1.
Figure 3:
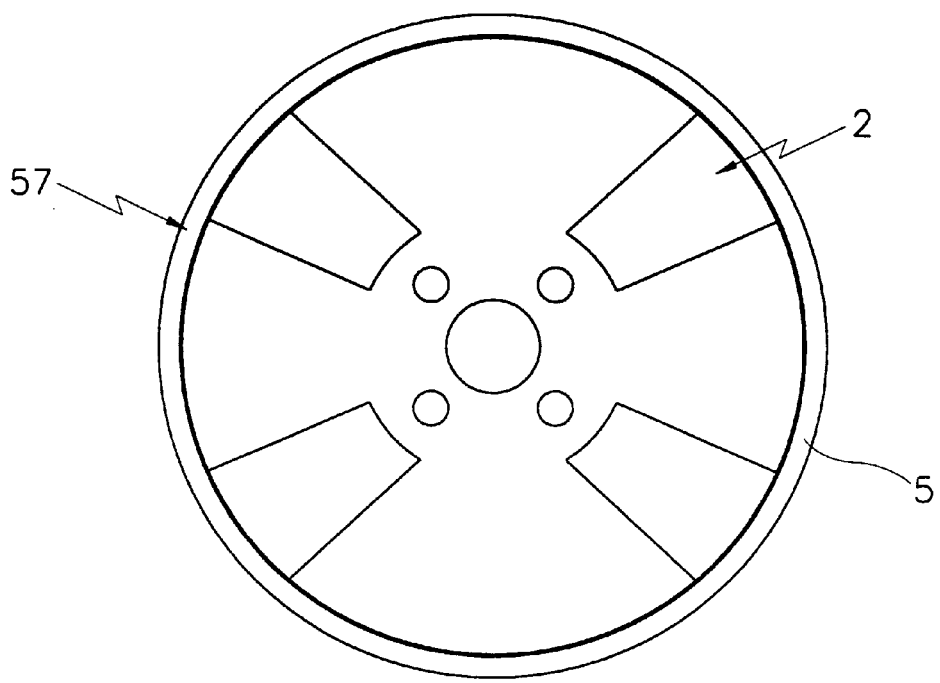
FIG. 3 is a plan sectional view of FIG. 1.

FIGS. 1, 2 and 3 are respectively a sectional view of a disposed state of a valve in a shock absorber according to the present invention, an exploded perspective view of FIG. 1 and a plan sectional view, where the shock absorber includes a plurality of orifices 62 formed at the piston 57, a valve 2 formed at a tip end thereof with an open/close unit 1 so as to move toward radial direction of the piston 57 at an orifice formation position to thereby open/close the orifices 62, guide means arranged between the valve 2 and the piston 57 such that the valve 2 can horizontally move but cannot break away toward shaft direction of the piston 57, and actuating means for moving the valve 2 according to a force applied to the fluid when the piston 57 moves toward an expanding direction.

The guide means further includes a plurality of guide grooves 3 formed in radial direction at an orifice formation position of the piston 57, a guide protruder 4 formed at the valve 2 where each valve 2 is inserted into each guide groove 3 so as to horizontally move lest it should break away toward an upper surface of the piston 57 and a fixing ring 5 for being fixedly inserted into an outer diameter of the piston 57 so as to restrict the valve 2 inside the guide groove 3.

Furthermore, the actuating means is provided with a slant surface 6 formed at the valve 2 contacting the fluid to horizontally change the force of the fluid (F) applied on the valve 2 when the piston 57 moves toward the expanding direction, thereby generating a force for moving the valve 2, and a spring 7 provided between the valve 2 and the fixing ring 5 opposite to the orifice 62 so as to resiliently press the valve 2 toward the orifice direction.

In other words, when the piston 57 moves upwards on the drawing, a force of P is applied to the slant surface 6 of the valve 2, and the force P is changed to a horizontal force (P') such that the valve 2 is horizontally moved and the open/close unit 1 formed at the tip end of the valve 2 serves to open and close the orifices 62.

Now an operational effect of the present invention thus constructed will be described.

When a vehicle bounces, the housing 53 at the shock absorber 53 moves up and down. When the housing 53 at the shock absorber moves up and down, the piston 57 formed therein also moves up and down. In other words, when the shock absorber is compressed, the piston 57 moves downwards.

At this time, the slant surface 6 of the valve 2 is not applied by the pressure of the fluid (F) and is resiliently supported by the spring 7 from the end surface of the valve 2, such that the open/close unit 1 of the valve 2 blocks the orifice 62 as illustrated in FIG. 1 in dotted line.

When the orifice 62 is blocked by the valve 2 to thereby prevent the fluid (F) from moving toward the first chamber 55, the fluid (F) in the second chamber 56 is pressured to thereafter move to the storing chamber 52 through the foot valve 58.

When the piston 57 moves upwards under this state, the force (P) is applied to the slant surface 6 of the valve 2. Of course, the force (P) is dependent upon the speed at which the shock absorber rebounds, and when the force (P) is applied to the slant surface 6, a force (P') is horizontally generated from the slant surface 6 along a vector of force.

The force (P') actuates as a horizontally pushing force of the valve 2, and when the force (P') is stronger than the resilience of the spring 7, the valve 2 is pushed to the right side on the drawing to thereby open the orifice 62.

Figure 4:
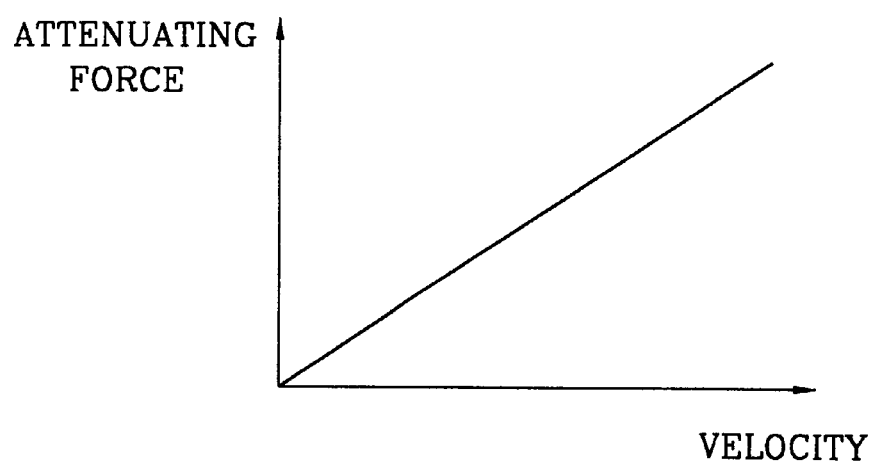
FIG. 4 is a graph for illustrating an actuating statue of a shock absorber according to the present invention.
Figure 5:
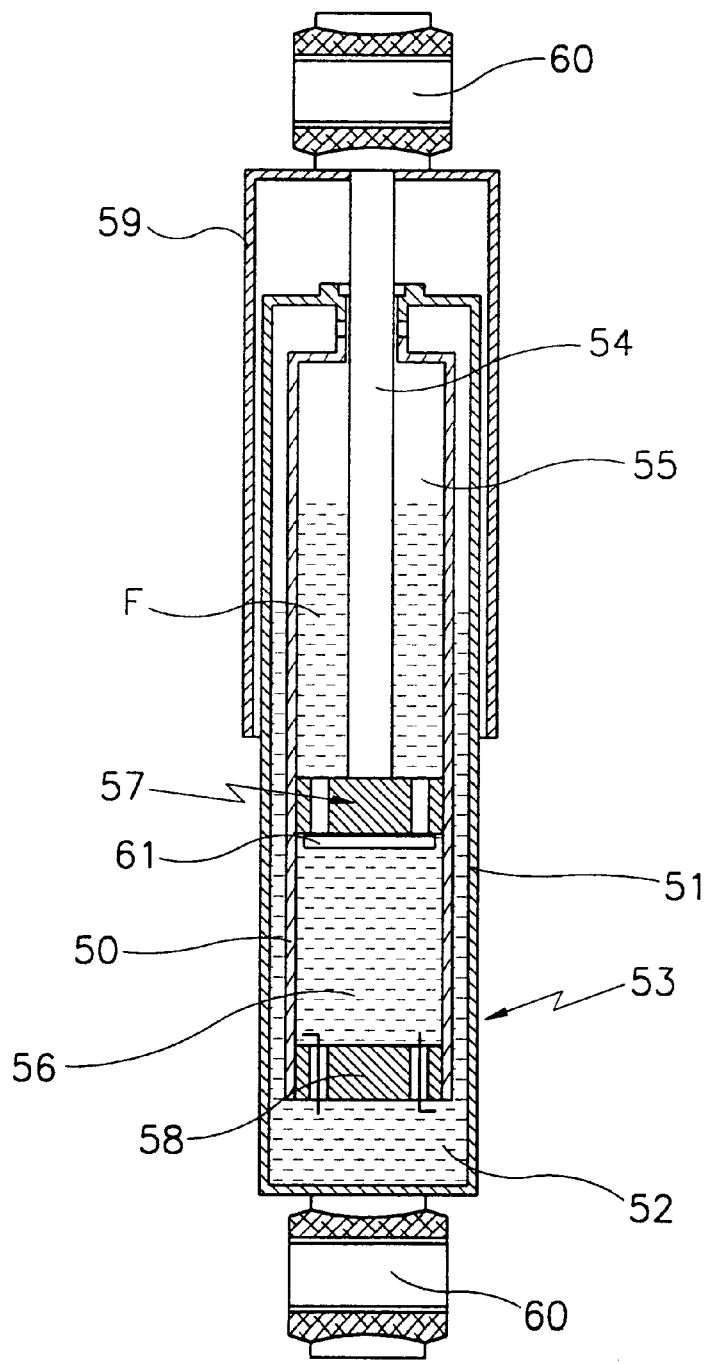
FIG. 5 is a sectional view for illustrating a shock absorber for a conventional vehicle.
Figure 6:
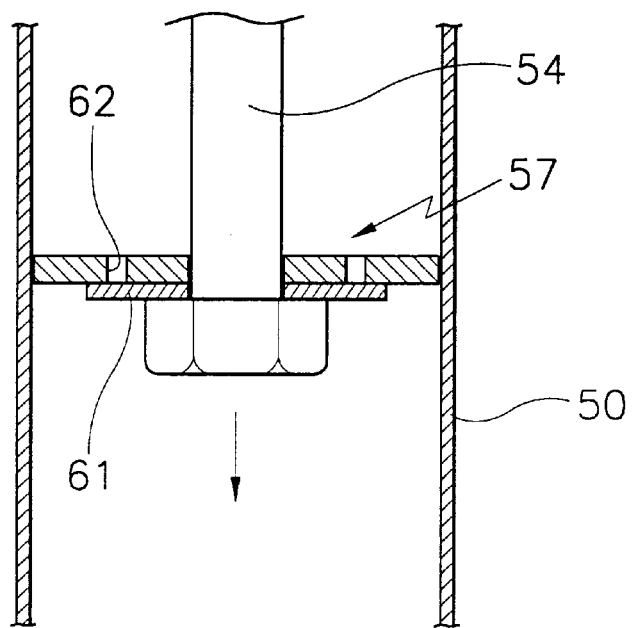
FIG. 6 is a partially enlarged view for illustrating disposed states of a piston and a valve.
Figure 7:
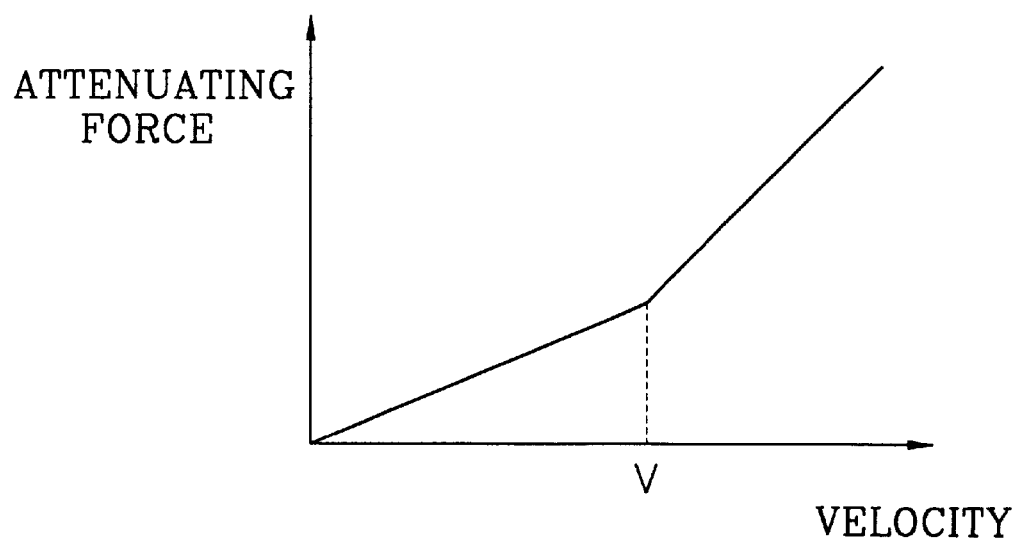
FIG. 7 is a graph for illustrating an actuating statues of a valve for the shock absorber in FIG. 5.

When the orifice 62 is opened, the fluid (F) moves toward the second chamber 56 through the orifice 62 and an attenuating force is generated by the resistance of the fluid (F) passing through the orifice 62. The attenuating force is linearly formed as illustrated in FIG. 4, where the attenuating force can be optimally adjusted by generation of vector force (P') from the slant surface at the valve 2 and resilience of the spring 7.

In other words, the valve 2 of steel material horizontally moves to open and close the orifice 62 and opened degree of the orifice 62 is changed linearly, such that the sudden change of resilience does not occur which is generated when the conventional plate-like open/close valve 61 is bent to thereby open and close the orifice 62.

Furthermore, when the attenuating force is linearly varied, an optimal open state of orifice 62 according to a rebound state (bound of rebound state according to vehicle speed) can be realized and motional performance of the shock absorber can be improved. When the attenuating force of the shock absorber is linearly changed, adjustment of attenuating force at a suspension system of a vehicle can be optimized to remarkably improve rideability of the vehicle and motional performance.

As apparent from the foregoing, there is an advantage in the shock absorber according to the present invention thus described in that a valve for generating an attenuating force at the shock absorber is so disposed as to horizontally move at a piston surface according to operation of the piston, such that the attenuating force is linearly changed to thereby improve a rideability of a vehicle and motional performance remarkably.

What is claimed is:

1. A shock absorber including a piston and rod assembly slidably disposed within a cylindrically closed housing filled with fluid where an attenuating force is generated by fluid resistance caused by the fluid moving through orifices in the piston during expansion and compression of the shock absorber, the shock absorber comprising:

a plurality of valves formed to horizontally move on the upper surfaces of the piston to thereby open and close the orifices;

guide means disposed between each valve and the piston, wherein each valve is constrained to move horizontally inwardly and outwardly with respect to the piston rod; and fluid force driven actuating means for horizontally moving each valve responsive to fluid forces acting over a surface of the valve, wherein the fluid force is formed by movement of the piston in the housing during expansion or compression of the shock absorber.

2. The shock absorber as defined in claim 1, wherein the guide means comprises:

a plurality of guide groves formed in a radial direction at predetermined positions on the piston; and a guide protruder formed at each valve where each valve is inserted into each guide groove so as to prevent the valves from breaking away toward an upper surface of the piston.

3. The shock absorber as defined in claim 1, wherein the valve further comprises an orifice closing tip constructed to open and close the orifice opening.

4. The shock absorber as defined in claim 1, wherein the actuating means comprises:

a slant surface formed at each valve contacting the fluid to horizontally change the force of the fluid applied on the valves when the piston moves upwardly during shock absorber expansion, thereby generating a force for moving each valve; and a spring provided between each valve and a fixing ring opposite to each orifice so as to resiliently press the valve towards the orifices.

5. A shock absorber disposed with a piston having a cylindrically closed housing filled with fluid where an attenuating force is generated by a fluid resistance caused by the fluid moving through a plurality of orifices, the shock absorber comprising:

- a plurality of guide grooves radially spaced about a a piston where orifices are formed in the piston at an one end of each groove;
- a plurality of valves, each valve including a guide protruder inserted into each guide groove so as to prevent the valves from breaking away toward an upper surface of the piston and each valve formed with a slant surface to allow the valve to move in an orifice open direction according to a force applied by fluid pressure when the piston is moved toward an expansion direction; and
- a spring disposed between the piston and the valve in order to bias the valve in an orifice closed direction.

6. A shock absorber including a piston and rod slidably disposed within a cylindrically closed housing filled with fluid where an attenuating force is generated by fluid resistence caused by the fluid moving through orifices in the piston during expansion and compression of the shock absorber, the shock absorber comprising:

- a plurality of valves formed to move on an end surface of the piston to thereby open and close corresponding orifices;
- a guide disposed between each valve and the piston, wherein the valves are constrained to move toward and away from the corresponding orifices;
- a slant surface formed at each valve responsive to changing fluid pressure as the piston moves in the housing, and a spring acting to resiliently press each valve in a direction away from its corresponding orifice when the piston moves during shock absorber compression and expansion.

7. The shock absorber of claim 6, wherein the valve guides are constrained to move within grooves, the grooves being radially spaced about the piston.

8. The shock absorber of claim 7, wherein the biasing springs are constrained to move within the radially spaced grooves.

* * * * *